United States Patent [19]

Shimdada et al.

[11] 4,162,389

[45] Jul. 24, 1979

[54] WELDING APPARATUS

[75] Inventors: Wataru Shimdada; Kazumichi Machida; Susumu Hoshinouchi; Seigo Hiramoto; Masaru Okada, all of Amagasaki, Japan

[73] Assignee: Mitsubishi Denki Kabushiki Kaisha, Tokyo, Japan

[21] Appl. No.: 792,342

[22] Filed: Apr. 29, 1977

[30] Foreign Application Priority Data

May 19, 1976 [JP] Japan .................. 51-58106

[51] Int. Cl.$^2$ .................. B23K 9/12
[52] U.S. Cl. .................. 219/121 P; 219/125.12; 219/76.16; 219/75; 219/130.32
[58] Field of Search .................. 219/121 P, 74, 75, 76, 219/131 F, 130, 124, 76.16, 125.12

[56] References Cited

U.S. PATENT DOCUMENTS

| 3,024,353 | 3/1962 | Brashear, Sr. | 219/131 F |
| 3,324,278 | 6/1967 | Jackson | 219/74 |
| 3,526,740 | 9/1970 | Brinkman et al. | 219/74 |
| 3,527,916 | 9/1970 | Ebert et al. | 219/74 |
| 3,581,053 | 5/1971 | Manz | 219/131 F |
| 3,803,380 | 4/1974 | Ragaller | 219/121 P |
| 3,818,176 | 6/1974 | Brown | 219/124 |
| 3,838,244 | 9/1974 | Petrides et al. | 219/131 F |
| 3,843,866 | 10/1974 | Kensrue | 219/131 F |
| 3,891,824 | 6/1975 | Essers et al. | 219/121 P |
| 3,944,778 | 3/1976 | Bykhovsky et al. | 219/121 P |
| 3,949,188 | 4/1976 | Tateno | 219/121 P |
| 3,956,610 | 5/1976 | Karbe et al. | 219/131 F |
| 4,023,006 | 5/1977 | West et al. | 219/121 P |

FOREIGN PATENT DOCUMENTS

| 2205705 | 8/1973 | Fed. Rep. of Germany | 219/131 F |
| 47-41660 | 12/1972 | Japan | 219/131 F |

Primary Examiner—E. A. Goldberg
Assistant Examiner—M. Paschall
Attorney, Agent, or Firm—Oblon, Fisher, Spivak, McClelland & Maier

[57] ABSTRACT

In a welding apparatus for overlaying on a base metal, a reverse polarity soft plasma arc is formed between an electrode and the base metal and a welding rod is fed into the arc to weld the base metal by melting the welding rod and the feeding speed of the welding rod is controlled corresponding to the arc current to form a bead having low penetration.

The electrode is oscillated and an active gas such as $CO_2$ or $O_2$ is incorporated in a shield gas at a rate controlled corresponding to the oscillation of the electrode.

6 Claims, 16 Drawing Figures

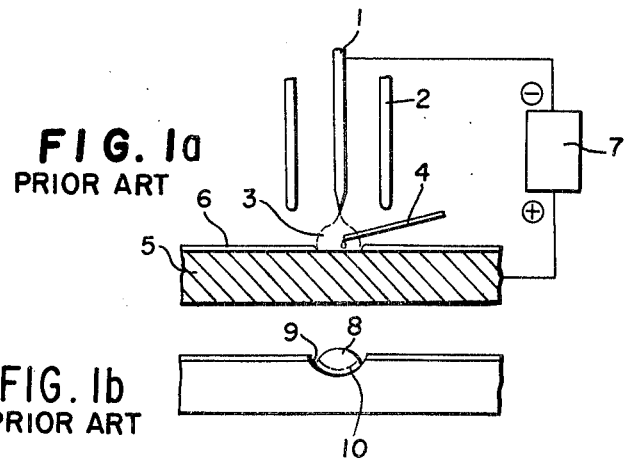
FIG. 1a PRIOR ART
FIG. 1b PRIOR ART
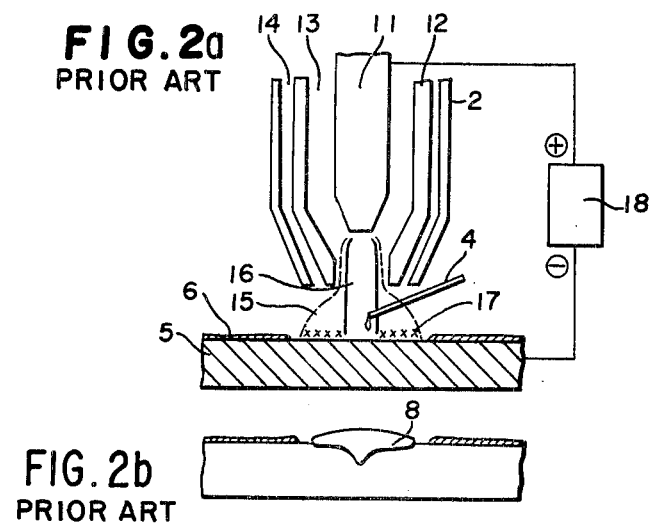
FIG. 2a PRIOR ART
FIG. 2b PRIOR ART
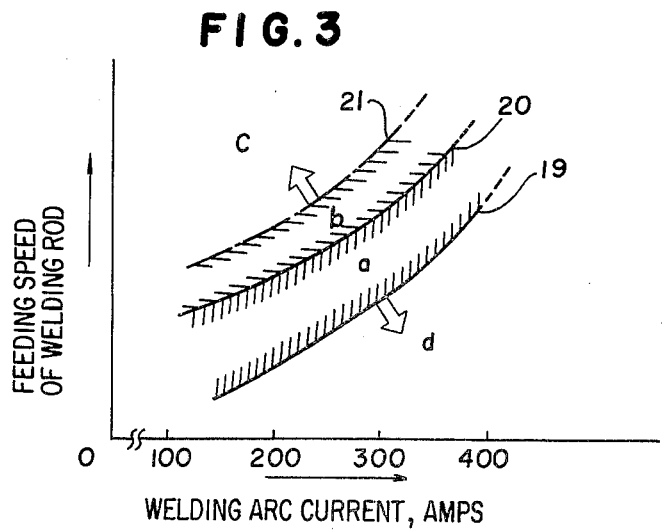
FIG. 3

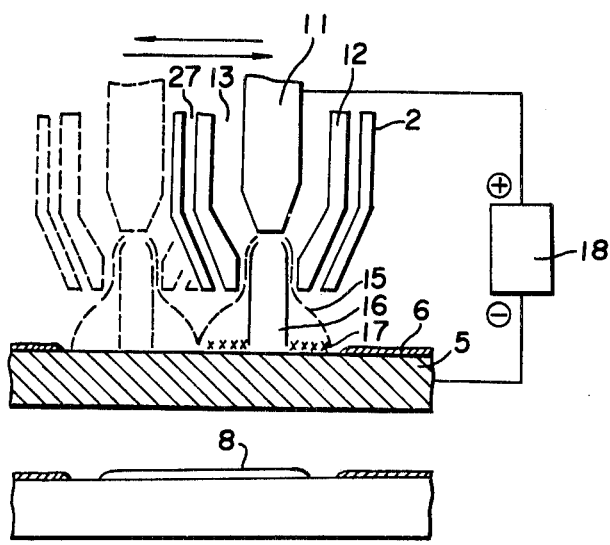
FIG. 7a
FIG. 7b
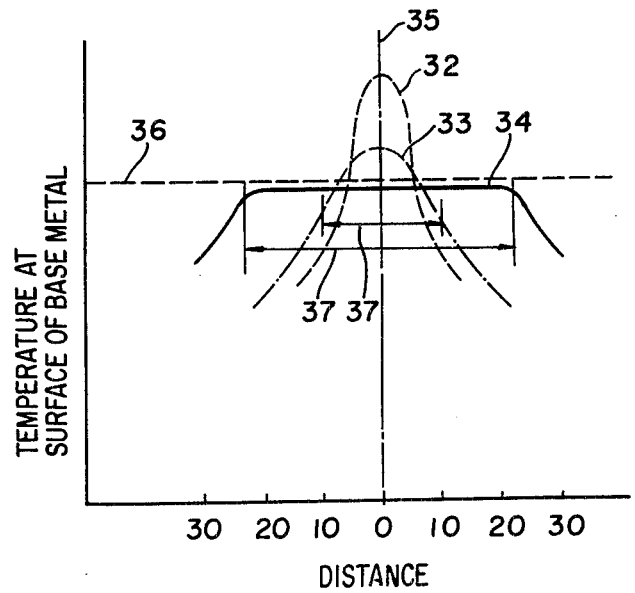
FIG. 8

{ 4,162,389 }

WELDING APPARATUS

BACKGROUND OF THE INVENTION

1. Field of the Invention

The present invention relates to a novel welding apparatus which imparts a bead having low penetration in a overlaying on a base metal. More particularly, it relates to a welding apparatus which imparts a smooth bead having low penetration and excellent affinity.

2. Description of the Prior Art

It is especially effective to use a reverse polarity soft plasma arc source in the operation of the present invention. Accordingly, the embodiment using a reverse polarity soft plasma torch will be illustrated though it is not limited to the embodiment.

When non-consumable electrode type arc sources such as the conventional TIG arc sources are used in overlaying operation, a penetration having at least 700 to 1000μ has been caused and a convex bead shape is formed even though the heating condition is controlled in the best condition.

FIG. 1 shows a schematic view of the conventional overlaying operation and a cross section view as a result of the operation.

The reference numeral (1) designates a tungsten electrode; (2) designates a shield nozzle; (3) designates a welding arc; (4) designates a welding rod; (5) designates a base metal; (6) designates a surface oxide film of the base metal (5); (7) designates a drooping characteristic DC welding power source in straight polarity; (8) designates an overlayed bead; (9) designates an under-cut and (10) designates a crack.

In the conventional overlaying operation, it is clearly disadvantageous to form the convex overlayed bead (8). However, when the dilution of the welded metal is increased by the increase of penetration of bead, the characteristic required for the overlayed metal is modified. When it is a combination of materials for forming intermetallic compound or segregated compound, cracks (10) are caused. When the welding operation is applied on the surface of the base metal having an oxide film, the under-cut (9) is caused in some welding conditions. These are further disadvantages in the conventional overlaying operation.

On the contrary, the shape of overlayed bead can be improved by using the reverse polarity soft plasma arc source.

Referring to FIG. 2, the fact will be illustrated. In FIG. 2, the reference numeral (11) designates a water cooled copper electrode; (12) designates a plasma nozzle; (13) designates a plasma gas; (14) designates a shield gas; (15) designates a soft arc; (16) designates a plasma jet flame; (17) designates cathode spots and (18) designates a power supply for welding which feeds the power in reverse polarity to the soft arc source (15).

The reverse polarity arc forms cathode spots (17) on a material having small work function such as the oxide film (6) on the surface of the base metal (5) and removes these impurities by the cleaning action to expose the bare surface of the base metal (5).

In comparison with the straight polarity arc, it has the characteristic for imparting wide heating distribution whereby the overlayed bead (8) having relatively high affinity can be formed because of the heat source characteristics.

However, a relatively large penetration is formed in the base metal (5) because of large quantity of heat and large blowing force of the plasma jet flame (16) of the arc (15) whereby the above-mentioned disadvantages may be caused.

SUMMARY OF THE INVENTION

The present invention is to provide a welding apparatus for overlaying on a base metal wherein a reverse polarity soft plasma arc is formed between an electrode and the base metal and a welding rod is fed into the arc to weld the base metal by melting the welding rod and the feeding speed of the welding rod is controlled corresponding to the arc current to form a bead having low penetration especially a smooth bead having high affinity in low penetration.

In the welding apparatus of the present invention, the feeding speed of the welding rod is controlled corresponding to the arc current and the electrode is oscillated and an active gas is incorporated in a shield gas at a rate controlled corresponding to the oscillation of the electrode.

BRIEF DESCRIPTION OF THE DRAWING

Various objects, features and attendant advantages of the present invention will be more fully appreciated as the same becomes better understood from the following detailed description of the present invention when considered in connection with the accompanying drawings.

FIG. 1 and FIG. 2 are respectively schematic views of conventional welding apparatuses;

FIG. 3 is characteristic diagram for illustrating the operation of the welding apparatus of the present invention;

FIG. 7 is a schematic view of the other embodiment of the welding apparatus of the invention;

FIG. 8 is a characteristic diagram for illustrating the embodiment;

DETAILED DESCRIPTION OF THE PREFERRED EMBODIMENTS

Figure 4:
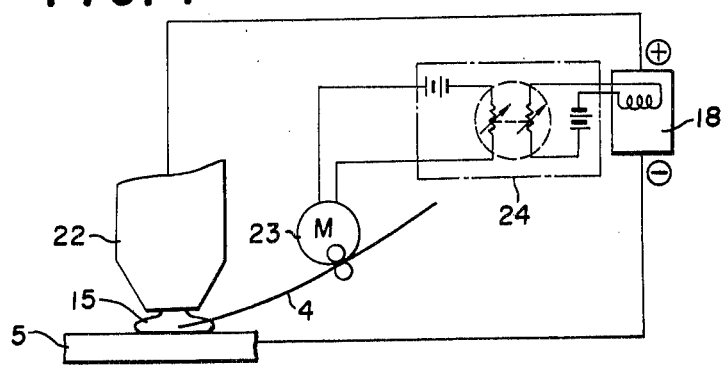
FIG. 4 and FIG. 5 are respectively schematic views of one embodiment of the welding apparatus of the present invention.

The present invention is to provide an improved welding apparatus which overcomes the fundamental problems which could not be attained by the conventional overlaying method.

FIG. 3 is the diagram illustrating the present invention to show the fact that the feeding speed of the welding rod should be controlled in order to attain a low penetration which is remarkably lower than that of the conventional apparatus in the overlaying operation of Stellite on a mild steel plate by using the reverse polarity soft plasma arc source.

In FIG. 3, the curves (19) to (21) show the conditions for regulations of the overlaying phenomena.

In the region a between the curves (19) and (20) the optimum condition for obtaining the overlayed bead (8) having remarkably low penetration is provided.

In the region b between the curves (20) and (21), the condition that the quantity of arc heat to the amount of the welding rod is deficient to cause an overlaying form having inferior affinity is provided.

In the region c above the curve (21) in left, the condition of incapability of melting the welding rod is provided.

In the region d below the curve (19) in right, the condition that the base metal (5) is visually melted to form the overlayed bead (8) having the penetration being the same with that of the conventional one is provided.

That is, the reverse polarity soft plasma arc source imparts large quantity of heat and blowing force of the plasma jet flame (16) at the central part of the soft arc (15) which mainly contribute for the penetration into the base metal (5).

It is possible to form the overlayed bead (8) having remarkable penetration and is attained by controlling the feeding speed of the welding rod (4) corresponding to the heat of the plasma jet flame (16) which corresponds to the welding arc current so as to take out the heat for melting the welding rod (4) in the plasma jet flame (16).

FIG. 4 shows one embodiment of the welding apparatus for imparting the effect by the method illustrated referring to FIG. 3.

In FIG. 4, the reference numeral (22) designates the reverse polarity soft plasma arc welding torch; (23) designates a unit for feeding the welding rod (4); and (24) designates a control unit for the simple work of the present invention, which includes a variable capacitor adjusted to control the condition of the feeding speed of the welding rod (4) and the welding arc current in the suitable region a of FIG. 3.

Figure 5:
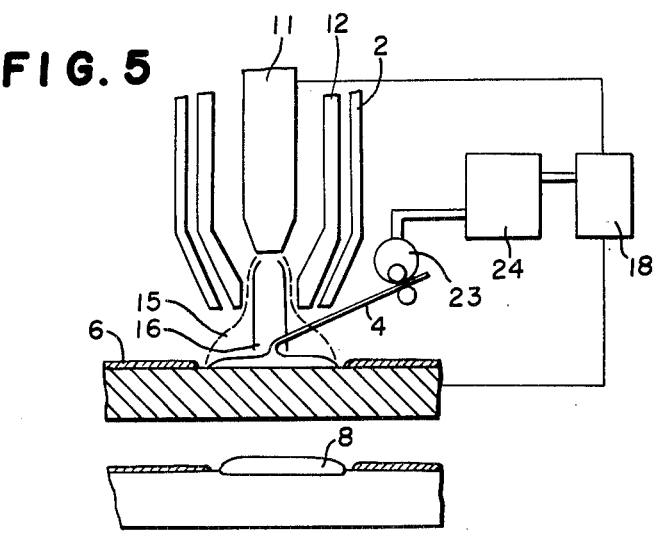

Referring to FIG. 5, the effect in the overlaying operation using the control unit according to the present invention will be illustrated.

The welding rod (4) reaches into the plasma jet flame (16) to effectively receive heat of the plasma jet flame (16) whereby it is melted to fall down, and it is rapidly spread on the bare metal surface exposed by the cleaning action, and the heat is given to the base metal to form the overlayed bead (8) having uniform and remarkably low penetration.

It has been illustrated that the overlayed bead (8) having remarkably low penetration which can not be expected by the conventional welding method can be attained by controlling the feeding speed of the welding rod (4) to the welding arc current.

The following table shows certain examples of the feeding speed control of the welding rod in the apparatus of the present invention, wherein a mild steel SS41 is used as the base metal and a rod of stainless steel SUS304, having a diameter of 1.0 mm is used as the welding rod.

Table

| Arc current (amp.) | Feeding speed of welding rod (m/min.) |
| --- | --- |
| 50 | 0.5 to 1.5 |
| 100 | 1.0 to 2.5 |
| 200 | 1.5 to 3.0 |
| 300 | 2.0 to 4.5 |
| 400 | 2.5 to 6.0 |

The present invention is to provide the welding apparatus for obtaining the overlayed bead (8) which has remarkably low molten influx and high affinity to be broad and smooth mound.

The operation of this embodiment will now be discussed.

As the simple method of forming the broad overlayed bead (8), the transverse oscillation of the heat source has been mainly applied. When the reverse polarity arc source is used, the distribution of the cathode spots is unstable during high speed the movement of the arc source, wherein the stable maintenance of the arc (15) is difficult so as to cause arc cut in sometimes. Accordingly, it has been necessary to employ the transverse oscillation at low frequency. In this case, a rough ripple is formed on the surface of the overlayed bead (8) lacks so that overlaped bead (8) smoothness. Accordingly, sometimes a grinder processing or other mechanical processing is needed after the welding operation.

With regard to this problem, studies have provided a method of imparting high speed transverse oscillation of the arc source while maintaining the stability of the arc (15). As the result, it has been found to be advantageous for a small amount of an active gas such as $CO_2$ or $O_2$ to be incorporated in argon gas as the shield gas.

However, the incorporation of the active gas may cause brittle deterioration of the welded part and the deterioration of the anticorrosiveness for certain materials of the base metals. Accordingly, it is necessary to minimize the amount of the active gas.

In order to maintain a smooth overlayed bead (8), it is necessary to increase the speed of the oscillation of the arc source depending upon the increase of the welding speed. The amount of the active gas should be increased depending upon the increase of the speed of the oscillation.

According to many experiments, it has been found that when the amount of the active gas is increased depending upon increasing the speed of the oscillation, the amount of active gas per unit length of the welding rod does not substantially increase whereby the above-mentioned trouble can be prevented.

Figure 6:
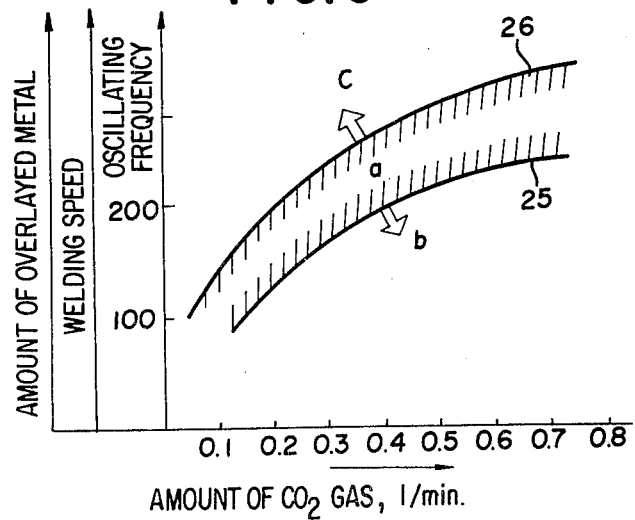
FIG. 6 is a characteristic diagram for illustrating operating conditions of the welding apparatus of the present invention.
Figure 9:
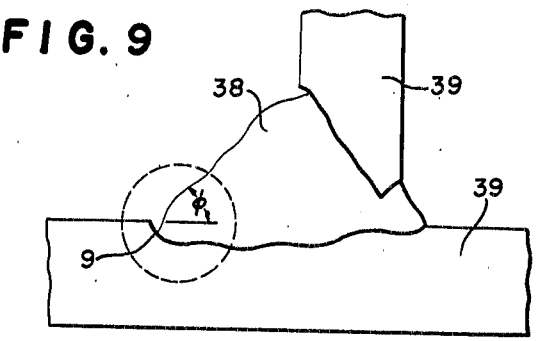
FIGS. 9 to 11 are respectively schematic views of the other embodiment of the welding apparatus of the present invention and FIG. 12 is a characteristic diagram showing the results of fatigue test for confirming the effect of the invention.

FIG. 6 is the diagram for illustrating the fact wherein the curves (25) and (26) define the conditions for regulation of the overlaying phenomena.

In the region between the curves (25) and (26), the stable soft arc (15) can be maintained and suitable overlayed result can be attained.

In the region b below the curve (25) in right, the amount of $CO_2$ gas in the shield gas is too much for the amount of the overlayed metal whereby a brittle layer of the welded part and the structure having deteriorated anticorrosiveness are formed.

In the region c above the curve (26) in left, the soft arc (15) can not be stable.

In accordance with these experiments, oscillation of the arc at high speed and with broad width is imparted under controlling suitable amount of $CO_2$ gas in the shield gas, whereby the mound or overlayed welded bead (8) having a remarkably smooth and broad surface can be obtained.

FIG. 7 shows the operation wherein the welding operation proceeds in a perpendicular direction with respect to the paper. The shield gas (27) comprises a main component of the inert gas such as Ar or He with an active gas such as $CO_2$ or $O_2$ in a minimum amount required for stabilizing the arc.

One example of the control of $CO_2$ gas incorporated in the shield gas depending upon the number of the oscillation is shown in the following table.

Table

| Number of oscillation cycle/min. | CO₂ gas liter/min. |
|---|---|
| 50 | 0.05 to 0.15 |
| 100 | 0.10 to 0.25 |
| 150 | 0.15 to 0.35 |
| 200 | 0.20 to 0.50 |
| 250 | 0.25 to 0.70 |
| 300 | 0.30 to 1.00 |

Note:
Base metal: mild steel SS41
Welding metal: stainless steel SUS304
Oscillating width: 30 mm
Shield gas: Ar 15 liter/min. const. + CO₂

The fact that the heating condition in broad width can be attained by high speed oscillation of the arc source to form a smooth and broad overlayed bead (8) has been illustrated.

In accordance with the welding apparatus of the present invention in which the feeding speed of the welding rod is controlled corresponding to the arc current and the electrode is oscillated and the active gas is incorporated in the shield gas at a rate controlled correspondingly to the speed of the oscillation, the overlayed bead (8) which has remarkably lower penetration compared to that of the conventional welding apparatus and has a smooth and broad surface and high affinity stability can be obtained.

FIG. 8 is the diagram for showing the result of the operation of the welding apparatus of the present invention on the heating condition of the base metal (5) in comparison with the conventional ones.

The lines (32) to (34) show the temperature distributions on the surface of the base metal (5) under the influence of the overlaying operation with the welding rod heated by various non-consumable electrode type arc sources.

In FIG. 8, the line (32) shows the case of TIG arc source; the line (33) shows the case of a conventional reverse polarity arc source; line (34) shows the case of the reverse polarity soft plasma arc source of the present invention, and the reference numeral (35) designates the center of the heat sources. Line (36) designates a melting point of the base metal (5) while (37) designates a cleaning zone by forming the cathode spots (17).

As is clear from FIG. 8, in the conventional overlaying method, the surface temperature of the base metal just below the arc is remarkably higher than the melting point whereby it is clear penetration is attained.

On the other hand, in the welding method of the present invention, the distribution of heating is widely broaden and the surface temperature of the base metal (5) is controlled to just initiate a melting or semi-melting condition in the broad area by the direct heating by the soft arc (15) and the plasma jet flame (16). When the molten welding rod (4) is continuously fed on the surface, the molten welding rod is spread at high speed in the clean region and the heat of the welding rod is transferred to the base metal (5) whereby it is solidified in a smooth overlayed form with quite low penetration.

The depth of the penetration is controlled to be about 50 to 150μ and a smooth overlayed form having high affinity is obtained.

FIGS. 10 to 13 show the embodiment of the present invention for improving fatigue strength of a welded edge part of a welded joint.

It has been known that usually, the fatigue strength of the welded joint is remarkably lower than that of smooth base metal.

The phenomenon is considered to be affected by the stress concentration caused by the reinforcement and by the under-cut on the welded joint.

Figure 10:
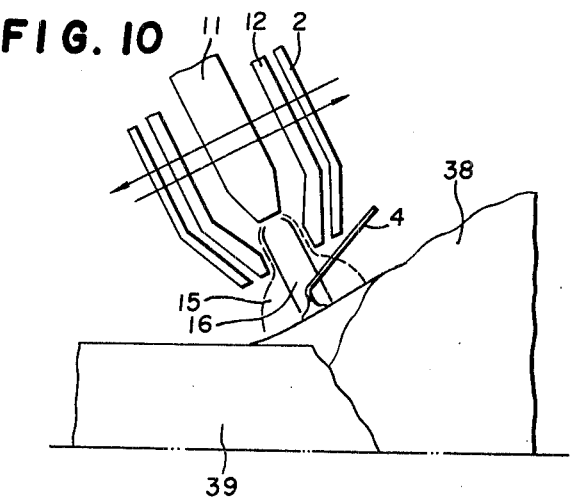

FIG. 10 is an enlarged view of the welded joint wherein reference numeral (38) designates a welded metal, and (39) designates a base metal having a fillet welded joint.

It has been known that the stress concentration is higher and the fatigue strength is lower depending upon sharpeness of the under-cut and the welded toe angle $\phi$ (Flank Angle $\phi$).

In the manual welding method or the carbon dioxide gas semi-automatic welding method using a welding rod, it has been difficult to prevent the formation of the under-cut at the welded toe.

Figure 11:
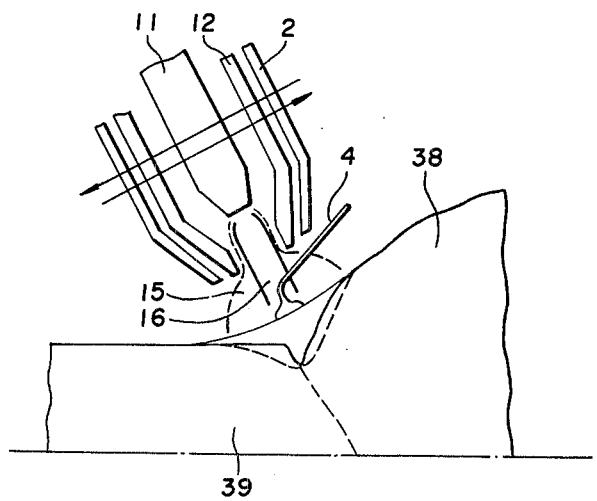

FIG. 11 is a schematic view of the welded toe of a joint formed by overlaying of a copper alloy without melting the base metal, in the reverse polarity soft plasma welding method using a metal having lower elastic modulus than those of the base metal (39) and the welded metal (38), such as the copper alloy as the welding rod (4).

In general, it has been known that the fatigue strength is improved by coating the stress concentrating part with a material having low elastic modulus. The embodiment is to impart the effect in accordance with the present invention.

In the embodiment of FIG. 11, the feeding speed of the welding metal is controlled and the high speed oscillation is performed to impart a smooth overlaying in low penetration whereby the stress concentration at the welded toe is reduced.

Figure 12:
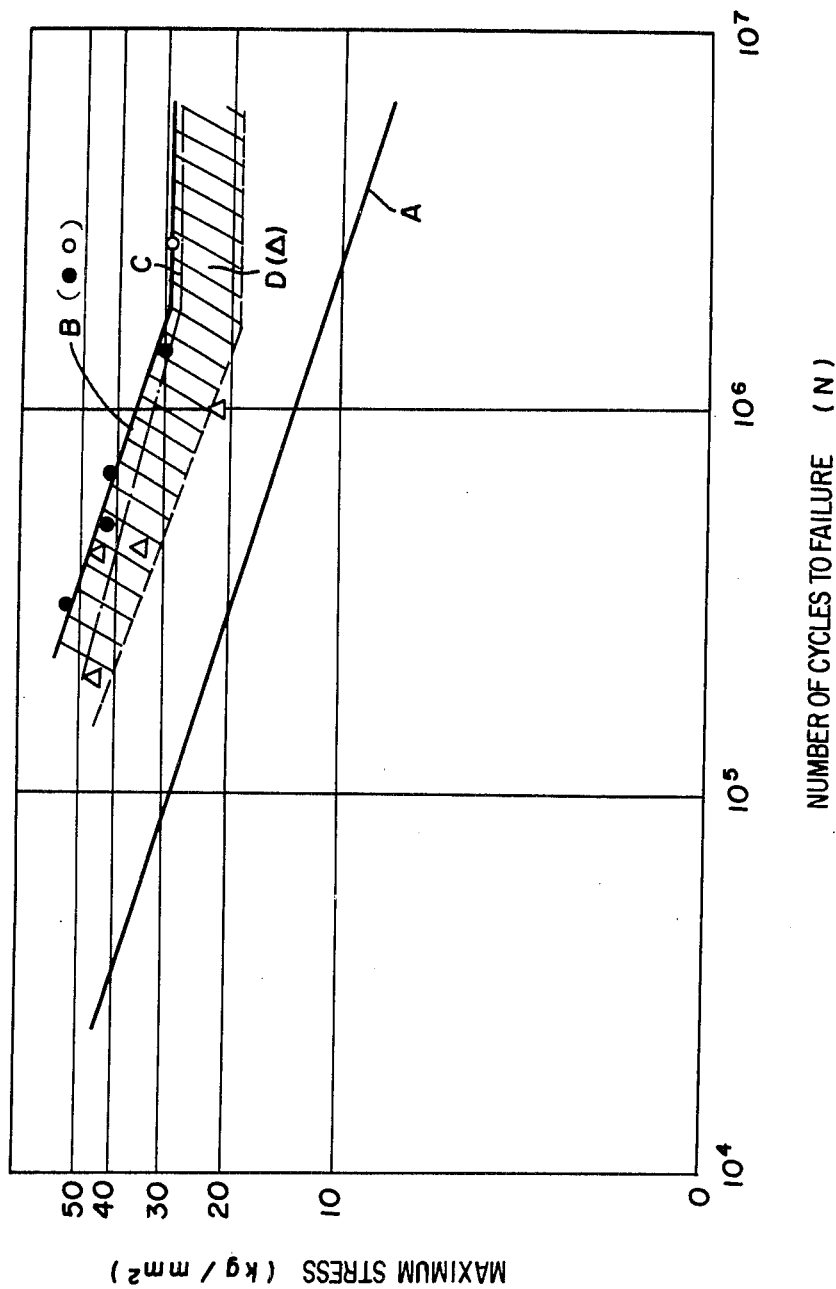

In the embodiment of FIG. 12, the metal of the base metal (39) is used for the welding rod (4), and the overlaying is performed in the the region obtaining the condition for melting the base metal of FIG. 3, whereby the defects such as the under-cut (9) is remelted to form the smooth welded toe.

In accordance with the feature of the present invention, even though there is much oxide scale on the surface of the base metal, the shape of the welded toe is remarkably smooth and the under-cut (9) is not formed in the embodiment.

In order to confirm the effect of the present invention, a fatigue test was performed. The results are shown in FIG. 13, wherein the reference A designates the fatigue strength of a cruciform welded joint of 80 kg/mm² high tensile steel; B designates the fatigue strength of a welded joint prepared by welding the edge with 50 kg/mm² steel welding rod in accordance with the present invention; and C designates the fatigue strength of a welded joint prepared by welding the welded toe with a copper alloy in the smooth form.

The effect of the present invention is remarkable.

In comparison of strength with the number of cycles to failure being $10^6$, about 2.5 times the fatigue strength can be attained in accordance with the present invention.

A method of treating the edge by the conventional TIG welding method has also been proposed. When the base metal having oxide film is treated by the TIG welding method, the fine under-cut may be caused again. Certain effect can be found, however, the fluctuation of the fatigue strength is large as in the region D of FIG. 13, and the reliability is low when it is applied for the construction.

As described above, in accordance with the present invention, form having remarkably low penetration can be obtained in the overlaying operation. It has been remarkably improved to provide a smooth bead surface having excellent affinity with remarkably low penetration.

It is further possible to improve various overlaying process results besides these embodiments by applying the present invention to various materials and joints. These other embodiments are included in the scope of the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A welding apparatus for welding a base metal which comprises:
   a reverse polarity soft plasma arc source;
   means for supplying shield gas connected to said arc source;
   welding rod feeding means disposed adjacent to said arc source;
   means for supplying arc current, in reverse polarity, to said arc source operably connected to said arc source and said base metal;
   means for controlling feeding speed of said welding rod corresponding to said arc current; and
   means for imparting a transverse oscillation to said arc source at a predetermined speed and for incorporating an active gas at a predetermined rate in said shield gas wherein said predetermined rate of incorporating active gas is automatically controlled correspondingly to said transverse oscillating speed of said arc source.

2. A welding apparatus according to claim 1, wherein the arc-source is a non-consumable electrode.

3. A welding apparatus according to claim 2, wherein the shield gas is an inert gas and the active gas is $CO_2$ or $O_2$.

4. A welding apparatus as set forth in claim 3, wherein said predetermined speed of oscillation is 50 to 300 cycles per minute and said predetermined rate of incorporating gas is 0.05 to 1.00 liters per minute.

5. A welding apparatus as set forth in claim 4, wherein said arc current is 50 to 400 amps and said feeding speed of said welding rod is 0.05 to 6.0 m/minute.

6. A welding apparatus as set forth in claim 3, wherein said arc current is 50 to 400 amps and said feeding speed of said welding rod is 0.05 to 6.0 m/minute.

* * * * *

UNITED STATES PATENT AND TRADEMARK OFFICE
CERTIFICATE OF CORRECTION

PATENT NO. : 4,162,389
DATED : July 24, 1979
INVENTOR(S) : WATARU SHIMADA ET AL

It is certified that error appears in the above-identified patent and that said Letters Patent are hereby corrected as shown below:

Please correct the first inventor's name:
[75] -- Wataru Shimada -- as it was misspelled in the
Letters Patent. The incorrect spelling was "Wataru Shimdada"

Signed and Sealed this

Sixteenth Day of October 1979

[SEAL]

Attest:

RUTH C. MASON
Attesting Officer

LUTRELLE F. PARKER
Acting Commissioner of Patents and Trademarks